United States Patent [19]

Vercruysse

[11] Patent Number: 5,416,593
[45] Date of Patent: May 16, 1995

[54] METHOD FOR DETERMINING A DISTORTION ANGLE IN A TEXTILE MATERIAL AND AN APPARATUS FOR USE THEREIN

[75] Inventor: Michel Vercruysse, Brunstatt, France

[73] Assignee: Mahlo, GmbH & Co. KG, Saal/Donau, Germany

[21] Appl. No.: 857,958

[22] Filed: Mar. 26, 1992

[30] Foreign Application Priority Data

Mar. 27, 1991 [DE] Germany .......................... 41 10 119.7
Apr. 11, 1991 [DE] Germany .......................... 41 11 871.5

[51] Int. Cl.$^6$ ............................................. G01N 21/84
[52] U.S. Cl. .................................... 356/429; 356/430; 356/237; 356/238; 250/571
[58] Field of Search ............... 356/429, 430, 238, 237; 250/571

[56] References Cited

U.S. PATENT DOCUMENTS 4,490,618 12/1984 Cielo ................................... 250/571
4,786,177 11/1988 Beckstein et al. .................... 356/429

Primary Examiner—Davis L. Willis
Assistant Examiner—LaCharles P. Keese, II
Attorney, Agent, or Firm—Marshall, O'Toole, Gerstein, Murray & Borun

[57] ABSTRACT

To order to determine a distortion angle in a textile material fed in a specific feeding direction, the textile material is monitored by means of a first detection means, the output signal of which depends on an angular position of said means with respect to the feeding direction and to the distortion angle. This first output signal is filtered so that signal components that are at least statistically independent of the distortion angle are filtered out. The filtering means used comprise a band-pass filter which is adjustable with respect to its center band-pass frequency, its bandwidth and/or the shape of its filter-curve shape by means of a second output signal from a second detection means. The second output signal is dependent on the frequency characteristic of those signal components in the first output signal that are at least statistically dependent on the distortion angle. In this way the band-pass curve of the filtering means can be adjusted to the distortion-angle-dependent signal components, so that the distortion angle can be ascertained with greater accuracy than hitherto.

25 Claims, 5 Drawing Sheets

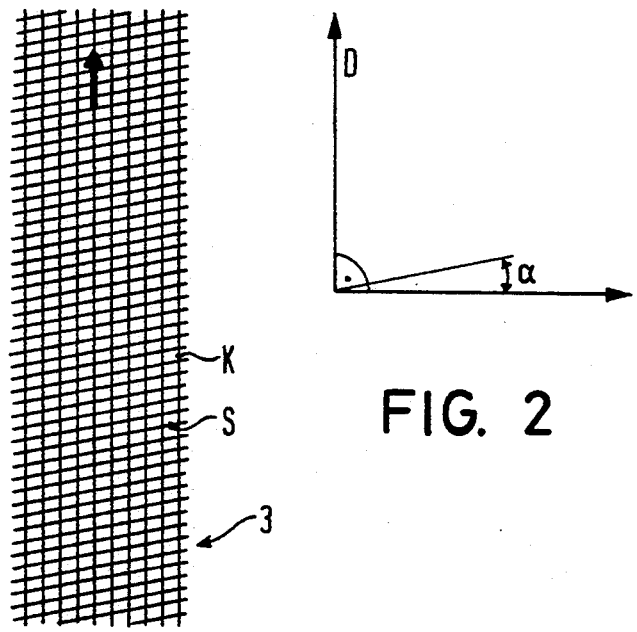
FIG. 2
FIG. 3
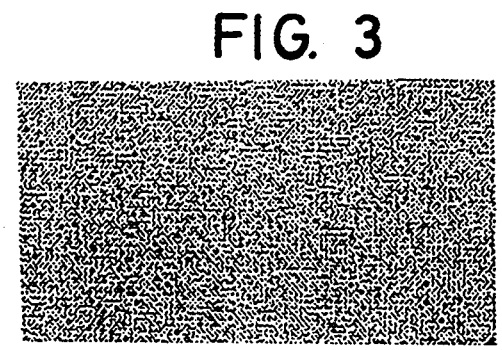
FIG. 4
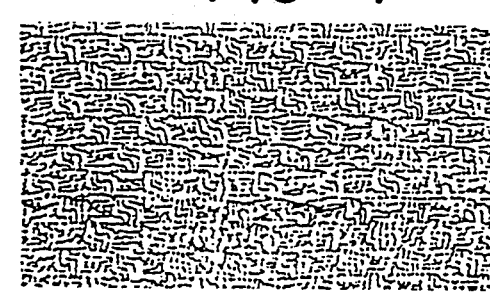
FIG. 5
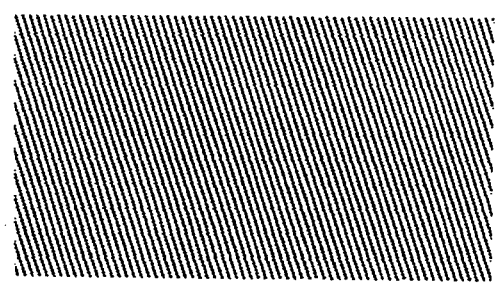

METHOD FOR DETERMINING A DISTORTION ANGLE IN A TEXTILE MATERIAL AND AN APPARATUS FOR USE THEREIN

FIELD OF THE INVENTION

The present invention relates to a method of determining a distortion angle in a textile apparatus such as a woven or knitted fabric and to an apparatus for use therein.

In the manufacture of woven fabric, warp and weft threads cross one another at right angles. However, in various later processing operations the fabric may become distorted. Similarly, in the manufacture of knitted fabrics on tubular knitting machines, the tube that is produced is cut open so that in general the resulting fabric is skewed.

DESCRIPTION OF THE PRIOR ART

In both the above cases, the distortion can be corrected by special-purpose machines, the operation of which is controlled by a signal derived from a measurement of the distortion angle.

In a conventional apparatus, a light is shone through the fabric as it is fed through the apparatus and photocells positioned opposite the light source convert the transmitted light signal to an electrical signal from which a distortion angle can be derived. Examples of equipment of this kind are described in German Patents DE-AS 11 09 636, DE-AS 12 22 012, and DE-OS 16 35 266 and in European Patent EP 0 262 525 A1. Apparatus is also known in which the light is reflected rather than transmitted, producing in principle the same signals.

For most known textile materials, the distortion angle can be ascertained fairly accurately with the optical methods in current use. However, for some problematic types of textiles the carrying out of an automatic straightening operation is of only limited applicability because of difficulty in the measurement of the distortion angle.

One of the sources of error in the measurement of the distortion angle is noise in the signals from the sensors. To improve the signal-to-noise ratio, filters are used, particularly band-pass filters. Nevertheless, some textile materials remain unanalyzable.

SUMMARY OF THE INVENTION

The object of the present invention is to provide a method for determining a distortion angle in a textile material with more accuracy than conventional methods, even with poorly analyzable sensor output signals, and to provide an apparatus for use in the method.

According to a first aspect of the present invention there is provided a method of determining a distortion angle in a textile material comprising the steps of feeding the material in a specific direction; providing a first detection means capable of generating a first output signal dependent on an angular position of the detection means with respect to said specific feeding direction of the material and to the distortion angle; monitoring the material with said first detection means to provide said first output signal; providing a filtering means for the first output signal, which filtering means comprises a band-pass filter defining a band-pass curve which is adjustable with respect to at least one of its center band pass frequency, its bandwidth, and its filter-curve shape; filtering the first output signal using said filtering means so that components of said first output signal which are at least statistically independent of the distortion angle are filtered out of said output signal; providing a second detection means capable of generating a second output signal dependent on the frequency characteristic of signal components in said first output signal that are at least statistically dependent on the distortion angle; inputting said second output signal to said filtering means so that said band pass curve can be adjusted with respect to said distortion-angle dependent signal components; and using an output signal from the filtering means to determine said distortion angle.

According to a second aspect of the present invention there is provided an apparatus for use in the determination of a distortion angle in a textile material being fed in a specific direction, comprising a first detection means capable of producing a first output signal dependent on an annular position of said first means with respect to said specific feeding direction and to the distortion angle; a filtering means comprising a band-pass filter defining a band-pass curve which is adjustable with respect to at least one of its center band-pass frequency, its bandwidth, and its filter-curve shape, said filtering means being capable of filtering out of said first output signal components that are at least statistically independent of the distortion angle; and a second detection means capable of producing a second output signal dependent on the frequency characteristic of signal components in said first output signal that are at least statistically dependent on the distortion angle and of sending said second output signal to said filtering means so that said band-pass curve can be adjusted with respect to said distortion-angle-dependent signal components.

Thus, in the invention it is first established which components of the output signal of the first detection means are statistically or demonstrably dependent on the distortion angle, further processing then involving only those output signals or signal components that have been shown to be so dependent.

The signal analysis, like the signal filtering, preferably takes place in the frequency domain. With prior signal analysis, performed in the time domain, i.e. using amplitude discrimination, two-dimensional graphing of the angle between a main sensor axis and the textile material vs. the output amplitude of the sensor signal can produce amplitude distributions with more than one maximum for a distortion angle of 0°, analysis of which gives ambiguous results. In contrast, with the present invention the signal components derived from "secondary peaks" are filtered out, so that further analysis can be based on only those signal components that are maximal when the main sensor axis is parallel to the warp thread. Surprisingly, it was found that this main peak in most cases is associated with the highest-frequency components within the output signals, which are reliably related to the distortion angle. It follows that the filtration can be very finely tuned, so that all the higher-frequency as well as all the lower-frequency signal components are suppressed.

However, there are fabrics for which the highest-frequency signal components dependent on the distortion angle have such low amplitudes that they cannot be evaluated. In such cases it is possible to adjust the filtration so that components at lower frequencies can be used for further evaluation. However, since these correspond to one of the above-mentioned secondary peaks, such signal components represent a "pattern" in the material, e.g. caused by a binding between warp and weft threads in a web, that is not perpendicular to the direction in which the material is moving but at another specific angle to it. Therefore, in evaluating such a signal a compensatory angle or a corresponding output signal must be subtracted from or added to the measured distortion angle.

When the output signal is split into its spectral components with sufficient precision, it is possible to derive directly from the spectrum an identification signal that identifies the frequencies of the signal components dependent on the distortion angle. In the simplest case this identification is brought about by determining the maximal value in the spectrum, where maximal value is understood to denote both the highest amplitude and the highest frequency.

In the spectra obtained with a few textile materials particular "patterns" have been found that often comprise several spectral components or frequencies. To investigate such materials, data obtained empirically from the material concerned and stored as reference criteria in a catalog can be entered for signal processing or identification. The reference data is obtained by arranging the material so that it is straight with a distortion angle of 0° and then storing the signals measured under these conditions as a "basic pattern", that is to carry out a "learning process". When it again becomes necessary to work with such a material, the learned pattern can be retrieved and used again for signal processing.

As another and, where appropriate, additional means of establishing which spectral components in the output signal of the sensor are dependent on the distortion angle, it is possible to measure the range of variation and/or variance of the components. In this case it is assumed that the most regularly occurring signal components are those most directly correlated with the material parameters of interest. Then those signal components with a variance exceeding a predetermined "confidence threshold" can be ignored. This method is particularly suitable for a material that is very difficult to analyze, when no pronounced maxima can be detected in the spectra.

In many cases the so-called thread count of the material being processed is determined; in the case of a woven web, this is the number of weft threads per unit of length. This value when multiplied by the feeding velocity of the material can be used to derive the highest distortion-angle-dependent signal frequency in the first output signal.

Another way to derive the frequency of the highest-frequency distortion-angle-dependent signal component is to generate an autocorrelation function of the sensor output signal. Here it is preferable to use a sensor or detection means, the output signal of which is independent of the distortion angle. The highest frequency can then be calculated from the shortest repetition period in the autocorrelation function.

When the output signal of a detection means with direction-dependent output characteristic is used exclusively, it is advantageous to obtain a frequency spectrum from the first output signal for each of several angular positions of detection means with respect to the feeding direction, and to store the spectra and their angular dependence. Then the position of the maximal spectral amplitude or amplitudes is determined for each stored spectrum. The frequency to which the filter devices should be adjusted is found by comparing the maximal spectral amplitudes so obtained for both frequency and amplitude. A considerable amount of the noise in the output signal is suppressed by subdividing the signal into different angle-dependent spectra, which makes it easier to determine the maximal value.

BRIEF DESCRIPTION OF THE DRAWINGS

FIG. 2 is a diagram to explain the concept of a distortion angle;

FIGS. 3 to 5 are plan views of various types of fabric;

FIGS. $13_1$ to $13_{16}$ show spectra of the output signal of the detection means shown in FIG. 9 for various positions of the detection means.

DESCRIPTION OF THE PREFERRED EMBODIMENTS

Throughout the following description identical components or groups of components, or those with the same function, are identified by the same reference numbers. Furthermore, although the following description refers to a woven web as the textile material to be investigated, the invention is applicable not only to woven fabrics but to all textile materials in which preferred directions for individual components can be specified.

Figure 1:
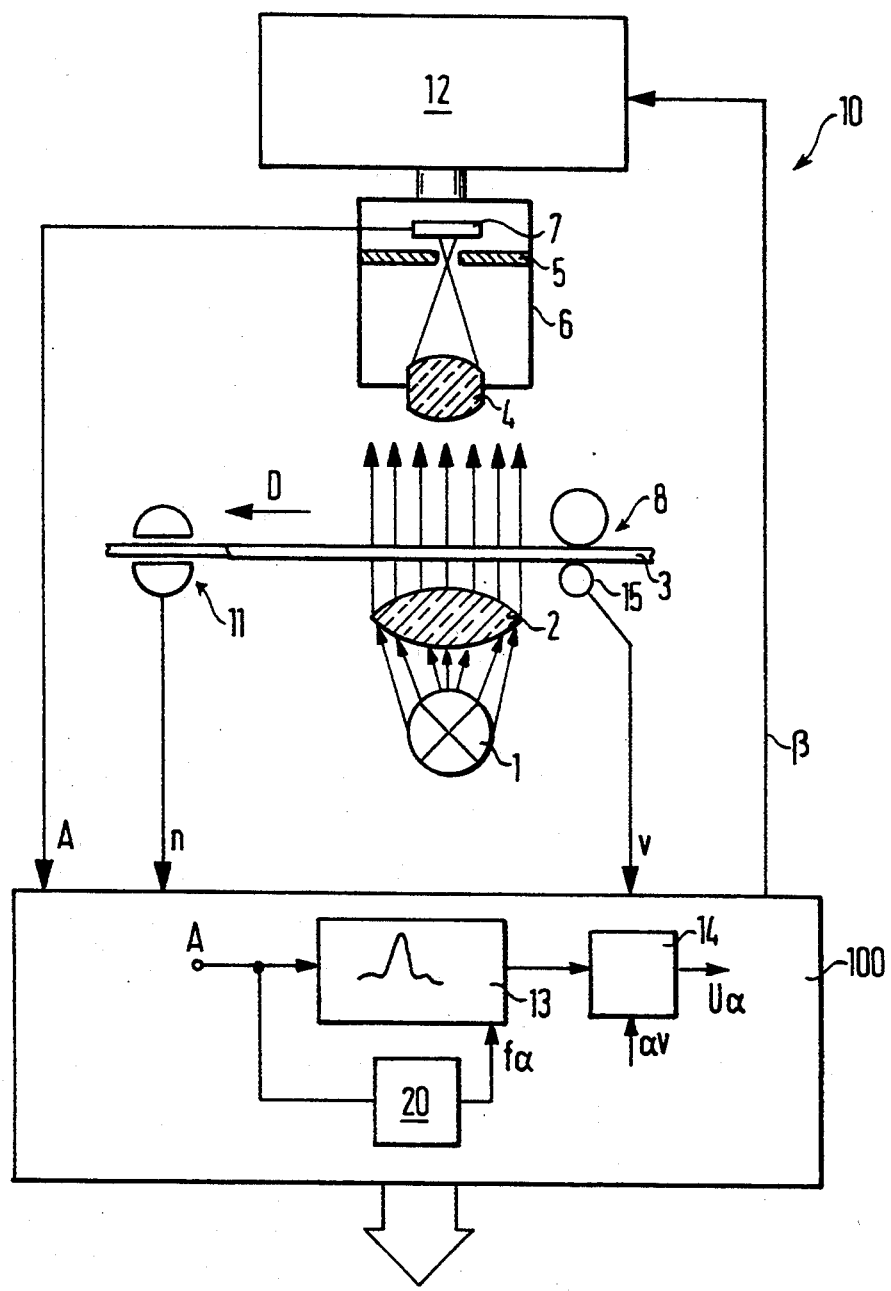
FIG. 1 is a schematic overall view of an apparatus for determining the distortion angle of a textile material.

In the apparatus shown in FIG. 1, a web 3 is fed by a feeding mechanism in a specific feeding direction D. Below the web 3 is a light source 1, the rays from which are focused into a beam by a lens 2 and transmitted through the web 3. On the other side of the web 3 the transmitted light passes through a cylindrical lens 4 and is focused through an aperture 5 before being incident on a photosensitive element 7, which is mounted in a housing 6 together with the slit aperture 5 and the cylindrical lens 4. The housing 6 can be set at a particular angle relative to the feeding direction D by way of a positioning motor 12.

This first detection system 10 thus comprises a light-emitting section 1,2, a light-sensing section 4-7 and a positioning section 12.

In addition, a thread counter 11 is provided adjacent the moving web 3, which gives an output signal for each passing weft thread.

The feeding mechanism 8 is also provided with a velocity meter 15, which sends out a signal proportional to the feeding velocity of the web 3.

An output signal A of the first detection system 10, the output signals n of the thread counter 11 and the velocity signals v of the velocity meter 15 are sent to an evaluating and controlling unit 100. This includes a computer, which in addition to evaluating the signals controls the positioning motor 12 and provides it with a sensor-angle signal $\beta$.

In addition to the customary components of a computer such as interfaces, program and data memory, and CPU, the evaluating unit 100 includes an adjustable band-pass filter 13, which can be constructed in either analog or digital technology. The filter 13 is adjustable with respect to the center frequency and bandwidth of the pass band as well as, where appropriate, the form or shape of the band-pass curve.

The output signal A, which is sent to an input of the filter 13, is also applied to an input of a second detection system 20. The operation of the detection system 20 is explained below but it is intended to generate an output signal fα, which is sent to the filter 13 in order to adjust its frequency characteristics as above.

The first output signal A, which is filtered according to the setting of the filter 13, is thereafter sent to an angle analyzer 14, which demodulates the signal and generates an output signal Uα, which represents the measured distortion angle. This output signal Uα is passed to regulating equipment (not shown) which eliminates the distortion angle in a manner known per se.

Furthermore, the angle analyzer 14 also receives from the computer a signal representing a preset angle $α_v$ by means of which a known error can be compensated for in the angle analyzer 14.

As shown in FIG. 2, the distortion angle α, which is to be determined by the method and using apparatus in accordance with the invention, is defined as the angle between weft threads S and the perpendicular to the feeding direction D, the feeding direction being identical to the orientation of warp threads K in a web 3.

The web symbolized in FIG. 2 is extremely simple in structure, resembling a window screen. Forms of web more commonly encountered are shown in FIGS. 3 to 5 where the warp threads lie in an horizontal direction. In the webs illustrated in FIGS. 3 and 4 a horizontal pattern is relatively clearly visible, but in the web of FIG. 5 it is obscured by a pattern at an acute angle, produced by the type of weaving illustrated here.

Figure 6:
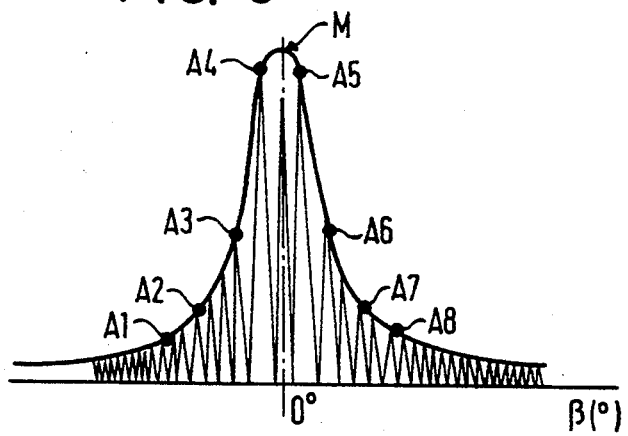
FIGS. 6 to 8 are graphs showing sensor output signals for a distortion angle of 0° for the fabrics shown in FIGS. 3 to 5 respectively.
Figure 7:
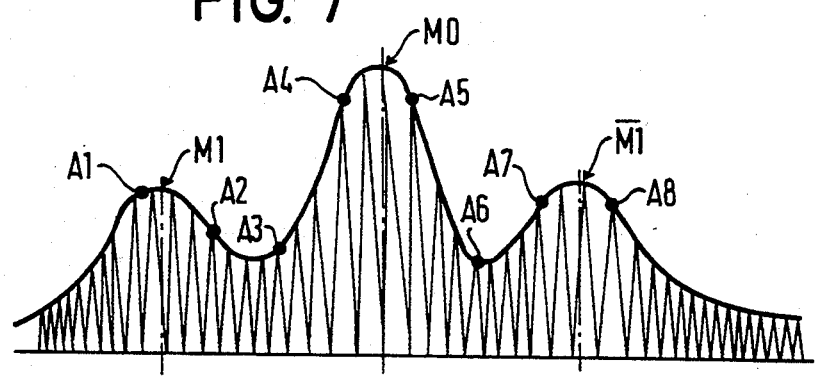
Figure 8:
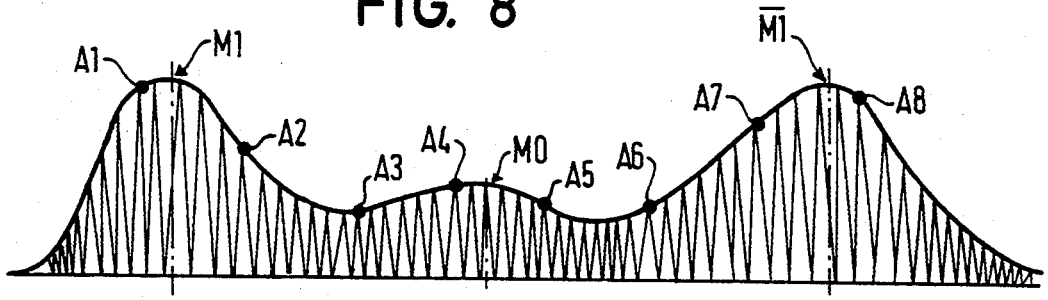

When an apparatus as shown in FIG. 1 is used to sample web structures as shown in FIGS. 3 to 5, it produces output signals like those in FIGS. 6 to 8 respectively. In these graphs the output amplitude A is plotted upward and the rotation angle β of the housing 6 is plotted toward the right and left of the angle 0°. FIGS. 6 to 8 were obtained with a web in which the distortion angle was 0°, that is the weft threads lay at right angles to the feeding direction D.

The curves are drawn as continuous lines but can also consist merely of representative individual points when, for example, the positioning motor 12 is a stepping motor. In FIGS. 6 to 8, eight such points $A_1$ to $A_8$ are shown.

FIG. 6 shows a clear maximum M amplitude at an angle β of 0°. It can be deduced from this that a distortion angle can be found by simply determining the maximal value M of the first output signal A over the range of angles β.

In FIG. 7 a maximum amplitude $M_0$ at 0° is flanked by secondary maxima $M_1$ and $\overline{M}_1$. These secondary maxima can also be discerned by visual examination of FIG. 4, where they appear as diagonal patterns in the web.

The graph in FIG. 8, which corresponds to a web as shown in FIG. 5, exhibits only a local maximum $M_0$ at 0°; the secondary maxima $M_1$ and $\overline{M}_1$ are higher than this local maximum $M_0$. If the maximal value in a first output signal of this sort were taken as a measure of the distortion angle, the result would be greatly in error. It is easy to imagine that the most critical case would arise when a signal curve is intermediate between those of FIG. 7 and FIG. 8, so that it is not clear whether an evaluation based on the maximal value is possible or not. In this situation if the maximum $M_0$ is at first distinctly discernible in the middle but thereafter disappears due to fluctuations or interference in the output signals, so that the largest amplitude is now associated with a secondary maximum $M_1$ or $\overline{M}_1$, the evaluation "jumps" and quite suddenly indicates a large distortion angle. The consequence would be that the correction systems controlled by this signal would be instructed to eliminate a nonexistent distortion and, in executing this instruction, would actually produce a distortion.

A first embodiment of the invention will now be described with reference to FIG. 9. In this embodiment the output signal A of the first detection system 10 is sent to a spectral analyzer 21. The latter is preferably an FFT analyzer, which generates a power spectrum. The upper limiting frequency of the spectrum is fixed by the sampling digitizing frequency in accordance with the familiar Shannon theorem, in such a way that the highest signal frequency of interest is below the middle of the spectral window. This is symbolized in FIG. 9 by the application of the output signal n of the thread counter 11 to the spectral analyzer 21.

The spectrum formed in the spectral analyzer 21 is loaded into a RAM memory unit 22 which is in bidirectional communication with a computer 23. The output signal v of the velocity meter 15 is also sent to the computer 23.

The memory unit 22 or an address generator contained in it in addition receives the control signal β for the positioning motor 12, which is a signal corresponding to the angle at which the first detection system 10 is set relative to the feeding direction D.

The operation of the apparatus shown in FIG. 9 will now be explained with reference to FIGS. 13 to 16.

Figure 13:
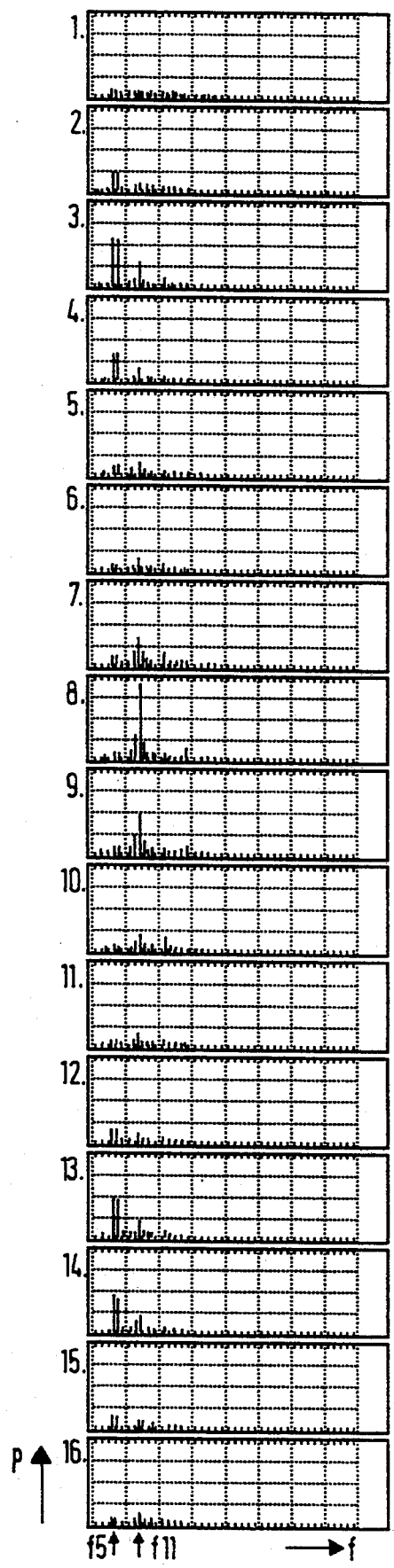

FIG. 13 shows 16 power spectra, one under another. Each of the power spectra 1 to 16 represents the distribution of the energy P, measured during a specified time span by the first detection system 10, over frequency f. Each of the various spectral to 16 was generated during the same time span for a different positioning angle β of the first detection system relative to the feeding direction D, and was stored in the memory unit 22.

Figure 14:
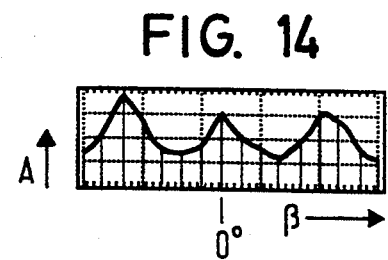
FIGS. 14 to 16 are output signal curves for various spectral components.

Considering the output signal A of the first detection system as a whole, it corresponds to a band-pass curve of the filter 13 that comprises all the frequencies contained in the spectra 1 to 16. The filter 13 is inactive, so to speak. The signal so evaluated then gives a distribution of the output amplitudes of the signal A over the angle β as shown in FIG. 14. The web associated with such a distribution corresponds approximately to that for which the graph in FIG. 8 was obtained, an example in which the cloth was fed with a distortion angle of 0°. Because of the similarity between the representations in FIG. 14 and FIG. 8, unambiguous identification of the distortion angle on the basis of the amplitude distribution of the first output signal A is very difficult.

By examining the individual spectra for the different positioning angles β shown one under another in FIG. 13, it can be seen that spectra 2 to 5 and 12 to 14 contain prominent maxima at the fifth spectral line $f_5$. The spectra 4, 5, 8, 9, 14 and 15 show at least local maxima at the 11th spectral line $f_{11}$.

Figure 9:
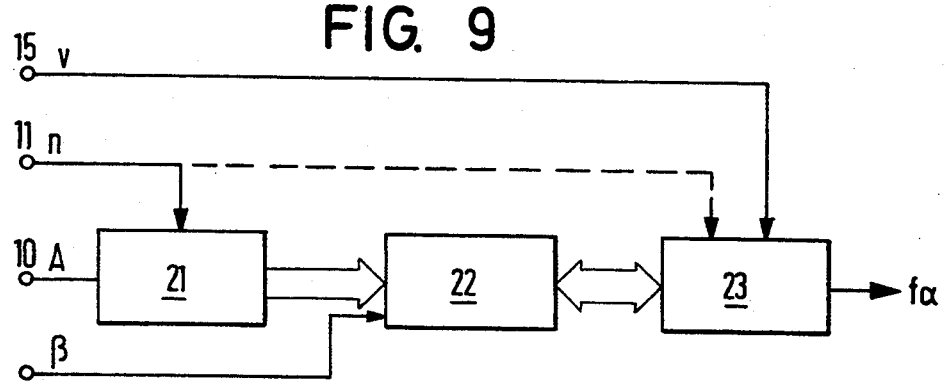
FIGS. 9 to 12 are diagrams showing four different embodiments of detection means for use in an apparatus according to the invention.
Figure 15:
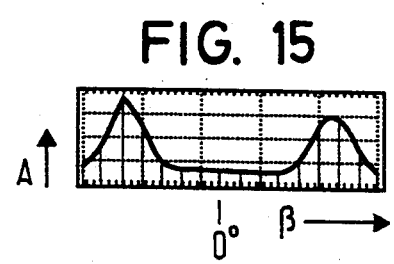
Figure 16:
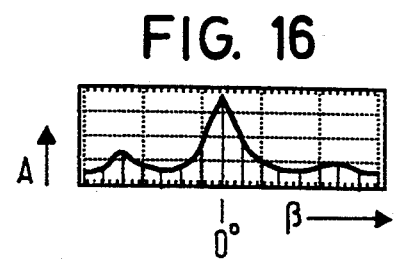

If the computer 23 in FIG. 9 is so designed that its output signal fα corresponds to the fifth spectral line $f_5$, the filter 13 will be set so that this frequency is the center frequency for the band-pass range. The signal components of the first output signal A examined by the angle analyzer 14 hence comprise only the narrow frequency range defined by $f_5$. The curve that then results is shown in FIG. 15. It is evident in this diagram that the secondary maxima shown in FIG. 14 are derived to a very great extent from signals at a relatively low frequency $f_5$. In contrast, if the filter 13 is set to the higher-frequency maximum $f_{11}$, the diagram shown in FIG. 16 results. Here the secondary maxima in FIG. 14 are largely suppressed, and the maximum at 0° is strongly emphasized. With a signal filtered in this way, the angle analyzer 14 can easily determine the position of the amplitude maximum and thus obtain the output signal $U\alpha$ corresponding to the distortion angle.

It can be seen from the above that it is relatively simple to find the distortion-angle-dependent signal components using spectra obtained from first output signals A for specified positioning angles $\beta$ off the first detection system 10, for the reason that the signal is well separated from the noise in the spectra and only a few lines in each spectrum reach high values. It is of course also possible to form a summed spectrum (without examining the spectra for all positioning angles $\beta$ individually) and to select from it the spectral line unambiguously associated with the highest signal frequency.

Furthermore, the second detection system 20 can be designed so that the output signal n of the thread counter 11 is sent to the computer 23, which derives from the signal n the frequency of the spectral line that is directly associated with the weft threads. This possibility only applies, of course, when the signal coming from the thread counter 11 is "clean" enough.

As is evident from the above, the spectral analyzer 21 averages over a certain time span. That is, the spectra represent mean values. As is generally known from statistics, there exist quantities related to mean values, such as range of variation, variance etc. which can be used to assign confidence ranges to individual values such as spectral lines, according to which the associated signal components are assessed as statistically independent of the web concerned or as significant. Consider, for example, the noise produced in every photocell; it contributes relatively high-frequency signal components that reach a relatively high amplitude, at least for very dense webs, and hence are prominently represented in the spectrum. However, these spectral components are statistically independent in themselves, being noise, and thus can be regarded as "interference signals" on the basis of their variance and thereby eliminated.

In the preceding discussion it was assumed that the material concerned is fed at constant speed. To compensate for fluctuations in the feeding velocity, the output signal v of the velocity meter 15 is transmitted to the computer 23, which makes use of it for purposes of normalization. A simple method of normalization is to multiply all the frequency values in the spectra by the measured velocity. The analysis of a uniform web thereby becomes independent of the feeding velocity.

Figure 10:
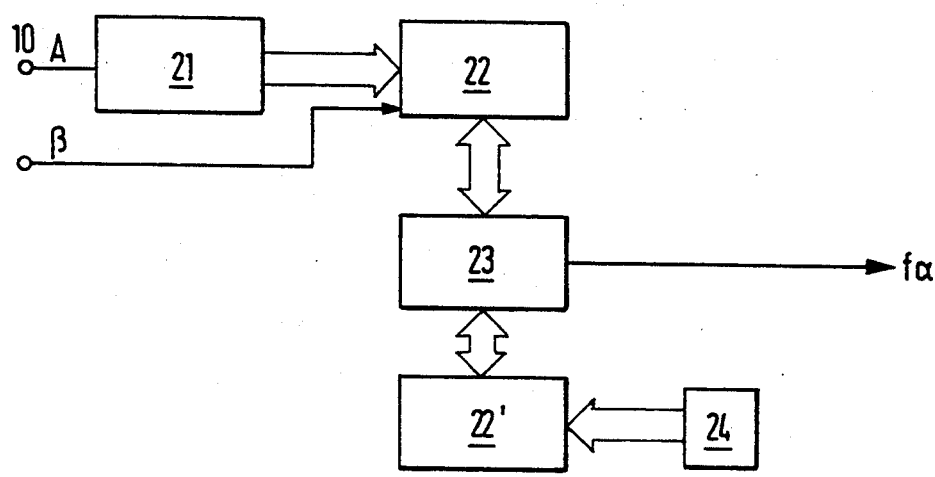

In a second embodiment of the invention as shown in FIG. 10, the spectra stored in the memory unit 22 are compared in the computer 23 with spectra stored in a memory unit 22', the latter having been entered as cataloged reference spectra by way of an input unit 24. Cataloged reference spectra of this sort can be obtained by determining the spectra for a definable web, e.g. a particular curtain fabric, and a known distortion angle, which is preferably 0°, and storing these spectra under a name associated with the particular web. Whenever that type of web is to be processed, the machine operator can call up the corresponding reference spectra by way of the input unit 24, and they will then be available to the computer 23 for comparison with the spectrum actually measured. From the comparison of spectra or even only a few reference frequencies of the spectra, a frequency-line pattern $f_n$ can be derived by means of which the filter 13 is set, so as to provide the angle analyzer 14 with a signal suitable for evaluation.

For example, it is conceivable for a fabric to give an output signal distribution like that shown in FIG. 15 when the filter 13 is at a broad-band setting, that is the signal lacks the maximal value ascribable to the distortion angle 0°, which is present in the middle of FIG. 14. In this case the computer 23 can use the spectral lines $f_5$ associated with the secondary maxima as shown in FIG. 15 as a basis from which to derive the filter-adjustment signal $f\alpha$. In this case, however, the computer 23 will derive a signal $\alpha v$ for the predetermined angle by which the maximum concerned is shifted from the null value. Dependent on whether the maximum on the right or that on the left in FIG. 15 is used in the angle analyzer 14 to obtain the distortion angle signal $U\alpha$, this predetermined angle $\alpha v$ must be added to the result or subtracted from it.

Figure 11:
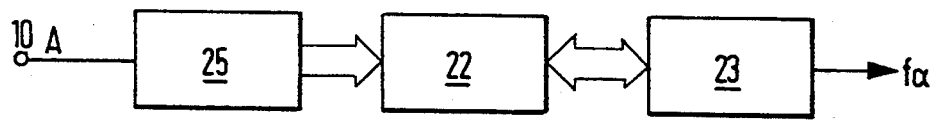

In a third embodiment of the invention as shown in FIG. 11, the highest frequency of the components dependent on the distortion angle in the output signal A of the first detection system 10, which in general is the frequency corresponding to the thread count, is derived by means of an autocorrelator 25, to which these output signals A are sent. The autocorrelation function formed in the autocorrelator 25 is then stored in the memory unit 22 and analyzed by the computer 23. Having identified the correlation maximum appearing at the shortest repetition period greater than 0, it is possible to find the highest frequency of the signal components dependent on the distortion angle. Hence the filter-adjustment signal $f\alpha$ can be calculated in this way.

Figure 12:
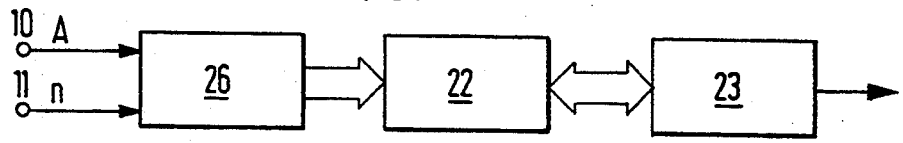

In a variation shown in FIG. 12, a cross-correlation function is formed between the output signal A of the first detection system 10 and the output signal n of the thread counter 11. Further evaluation is carried out above as described with reference to FIG. 11. The basic assumption here is that the same pattern appears in temporal sequence at the two "detection systems" 10 and 11. Because they are spatially separated, of course, the resulting time shift of the signals with respect to one another must be allowed for in evaluating the cross-correlation function.

What is claimed is:

1. A method of determining a distortion angle in a textile material comprising the steps of:

feeding the material in a specific direction;

providing a first detection means capable of generating a first output signal dependent on an angular position of the first detection means with respect to said specific feeding direction of the material and to the distortion angle;

monitoring the material with said first detection means to provide said first output signal;

providing a filtering means for the first output signal, which filtering means comprises a band-pass filter defining a band-pass curve which is adjustable with respect to at least one of its center bandpass frequency, its bandwidth, and its filter-curve shape;

filtering the first output signal using said filtering means so that components of said first output signal which are at least statistically independent of the distortion angle are filtered out of said output signal;

providing a second detection means capable of generating a second output signal dependent on the frequency characteristic of signal components in said first output signal that are at least statistically dependent on the distortion angle;

inputting said second output signal to said filtering means so that said band-pass curve can be adjusted with respect to said distortion-angle-dependent signal components; and using an output signal from the filtering means to determine said distortion angle.

2. A method as claimed in claim 1, wherein said second output signal comprises the highest-frequency distortion-angle-dependent signal components.

3. A method as claimed in claim 1, wherein said second output signal comprises a signal component below the highest-frequency distortion-angle-dependent signal components and wherein a signal corresponding to a predetermined angular quantity is subtracted from the second output signal.

4. A method as claimed in claim 1, wherein the first output signal is split into its spectral components and an identification signal is derived therefrom, the identification signal being input to said second detection means in order to identify the distortion-angle-dependent signal components.

5. A method as claimed in claim 4, wherein reference criteria are provided on the basis of cataloged fabric data to serve as said identification signal.

6. A method as claimed in claim 5, wherein a momentarily available distortion angle is entered by an operator and assigned to one of the momentarily available first and second output signals or their spectra in a learning process and said reference criteria are derived from said learning process.

7. A method as claimed in claim 6, wherein said reference criteria established in the learning process are stored under a fabric-specific label for later evaluation processes.

8. A method as claimed in claim 4, wherein the variation of the spectral components in at least one of said first and said second output signals is determined and spectral components which lie below a predetermined threshold are identified as distortion-angle-dependent.

9. A method as claimed in claim 8, wherein said threshold has been predetermined relative to background noise.

10. A method as claimed in claim 2, comprising the additional step of making a thread count and wherein the highest distortion-angle-dependent signal frequency in the first output signal is derived from said thread count.

11. A method as claimed in claim 2, wherein an autocorrelation function is constructed for the first output signal and the period of the highest-frequency distortion-angle-dependent signal component is derived from the position of the autocorrelation maximum.

12. A method as claimed in claim 1, wherein a frequency spectrum is derived from said first output signal for various positions of said first detection means with respect to said specific feeding direction and is stored as a function of the angle, and wherein for each spectrum the positions of the maximal spectral amplitudes are determined.

13. A method as claimed in claim 1, comprising the additional step of measuring a feeding velocity of the textile material and wherein the band-pass curve of the band-pass filter is adjusted, according to said measured feeding velocity, 14. An apparatus for use in the determination of a distortion angle in a textile material being fed in a specific direction, comprising:

a first detection means capable of producing a first output signal dependent on an angular position of said first detection means with respect to said specific feeding direction and to the distortion angle;

a filtering means comprising a band-pass filter defining a band-pass curve which is adjustable with respect to at least one of its center band-pass frequency, its bandwidth, and its filter-curve shape, said filtering means being capable of filtering out of said first output signal components that are at least statistically independent of the distortion angle; and a second detection means capable of producing a second output signal dependent on the frequency characteristic of signal components in said first output signal that are at least statistically dependent on the distortion angle and of sending said second output signal to said filtering means so that said band-pass curve can be adjusted with respect to said distortion-angle-dependent signal components.

15. An apparatus as claimed in claim 14, wherein said second detection means uses the highest-frequency distortion-angle-dependent signal components to produce said second output signal.

16. An apparatus as claimed in claim 14, wherein said second detection means uses a signal component below the highest-frequency distortion-angle-dependent signal component to produce said second output signal, and an input means is provided for said second detection means, which can subtract a signal corresponding to a predetermined angular quantity from said second output signal.

17. An apparatus as claimed in claim 14, wherein said second detection means comprises a signal-identification means which can operate to split said first output signal into its spectral components and to generate an identification signal so that distortion-angle-dependent signal components of said first output signal can be identified.

18. An apparatus as claimed in claim 17, wherein said signal-identification means comprises a keyboard through which reference criteria can be entered into the apparatus as said identification signal.

19. An apparatus as claimed in claim 18, wherein a momentarily available distortion angle can be entered through the keyboard and be assigned to one of momentarily available first and second output signals in a learning process and said reference criteria derived from said learning process.

20. An apparatus as claimed in claim 18, wherein a memory is provided for the readable storage of said reference criteria, which are stored under a fabric-specific label.

21. An apparatus as claimed in claim 17, wherein said signal-identification means comprises a computer which can determine the spectral components in at least one of said first and said second output signals, identify those spectral components which are distortion-angle-dependent, and thereby generate said identification signal when said spectral components fall below a predetermined threshold.

22. An apparatus as claimed in claim 14, wherein said second detection means comprises a thread counter.

23. An apparatus as claimed in claim 14, wherein said second detection means comprises a collator to which at least one of said first and said second output signals is sent and which can produce a frequency signal for use in the identification of said distortion-angle-dependent signal components.

24. An apparatus as claimed in claim 14, wherein said second detection means comprises:

a spectral analyzer to which is input said first output signal and the angular position of said first detection means with respect to said specific feeding direction;

a memory in which spectra of said first output signal produced by said analyzer are stored separately from one another for various said angular positions; and calculating means for finding amplitude maxima in said stored spectra.

25. An apparatus as claimed in claim 14, wherein said second detection means further includes means for measuring the feeding velocity of the textile material and for generating a velocity signal for use in the adjustment of the band-pass curve of said band-pass filter.

* * * * *

UNITED STATES PATENT AND TRADEMARK OFFICE
CERTIFICATE OF CORRECTION

PATENT NO. : 5,416,593
DATED : May 16, 1995
INVENTOR(S) : MICHEL VERCRUYSSE

It is certified that error appears in the above-indentified patent and that said Letters Patent is hereby corrected as shown below:

Column 6, line 38, "spectral to 16" should be --spectra 1 to 16--.

Column 7, line 15, "off the first" should be --of the first--.

Column 11, line 4, "a collator to" should be --a correlator to--.

Signed and Sealed this

Second Day of April, 1996

Attest:

BRUCE LEHMAN

Attesting Officer       Commissioner of Patents and Trademarks